United States Patent [19]

Ikezaki

[11] Patent Number: 5,367,316

[45] Date of Patent: Nov. 22, 1994

[54] REMOTE-CONTROL APPARATUS FOR ELECTRONICS APPARATUS

[75] Inventor: Masao Ikezaki, Neyagawa, Japan

[73] Assignee: Matsushita Electric Industrial Co., Ltd., Kadoma, Japan

[21] Appl. No.: 195,847

[22] Filed: Feb. 14, 1994

Related U.S. Application Data

[63] Continuation of Ser. No. 975,958, Nov. 13, 1992, abandoned, which is a continuation of Ser. No. 499,582, Mar. 27, 1990, abandoned.

[30] Foreign Application Priority Data

Mar. 28, 1992 [JP] Japan .................. 1-77598

[51] Int. Cl.$^5$ ............................................ G09G 3/02
[52] U.S. Cl. .................... 345/158; 305/169; 348/734
[58] Field of Search ............... 345/158, 156, 157, 160, 345/169, 173; 348/734

[56] References Cited

U.S. PATENT DOCUMENTS

| | | | |
|---|---|---|---|
| 4,246,452 | 1/1981 | Chandler | 200/5 A |
| 4,527,204 | 7/1985 | Kozakai et al. | 358/194.1 |
| 4,565,999 | 1/1986 | King et al. | 340/709 |
| 4,587,520 | 5/1986 | Astle | 340/712 |
| 4,626,892 | 12/1986 | Nortrup et al. | 358/21 R |
| 4,706,121 | 11/1987 | Young | 358/146 |
| 4,712,105 | 12/1987 | Köhler | 358/194.1 |
| 4,745,397 | 5/1988 | Layerhauer et al. | 358/194.1 |
| 4,796,019 | 1/1989 | Auerbach | 340/709 |
| 4,803,474 | 2/1989 | Kulp | 340/709 |
| 4,825,200 | 4/1989 | Evans et al. | 455/603 |
| 4,959,721 | 9/1990 | Micic et al. | 358/210 |
| 4,987,411 | 1/1991 | Ishigami | 340/709 |

FOREIGN PATENT DOCUMENTS 0176965  4/1986  European Pat. Off. .
2155714  9/1985  United Kingdom .

OTHER PUBLICATIONS

G. Zeisel, et al., "An Interactive Menu-driven Remote Control Unit For TV-receivers and VCR-recorders", IEEE Int. Conf. on Consumer Electronics, Jun. 1988, pp. 288–289.

H-J. Platte, et al., "A New Intelligent Remote Control Unit for Consumer Electronic Devices", IEEE Transactions on Consumer Electronics, vol. 31, No. 1, Feb. 1985, pp. 59–69.

Primary Examiner—Ulysses Weldon
Assistant Examiner—Doom Chow
Attorney, Agent, or Firm—Cushman, Darby & Cushman

[57] ABSTRACT

A remote-control apparatus for operating a plurality of audio visual apparatuses. On a display screen a plurality of icons showing functions and operation modes of audio visual apparatuses are displayed. An audio visual apparatus is selected and operated by pointing out an icon with a cursor. The cursor is shifted to predetermined positions on the display screen by manipulating one of several switches on the remote control apparatus. The shiftable destination of the cursor with respect to a switch is determined by a set of predetermined rules in which the relation between the switches and the destination of the cursor is changed based on the present position of the cursor.

13 Claims, 11 Drawing Sheets

| Present position of cursor | Shift rule of cursor | | |
|---|---|---|---|
| | Possible next positions to shift from the present position | Relation between switches of cursor key and positions of cursor shifted thereby | Cursor key switches which can not shift cursor at present |
| A (100) | B→↑ E→ G→ I↗ ↑A (110) | B 5A,5B,5H<br>E 5E,5F<br>G 5D<br>I 5C ↑A (120) | 5G (130) |
| B (101) | B↘ ↑A →C (111) | A 5E,5F,5G<br>B↘ ↑ →C 5A,5B,5C,5H (121) | 5D (131) |
| C (102) | C→B (112) | C→B 5E 5F 5G (122) | 5A,5B,5C,5D,5H (132) |
| D (103) | D↗ ↑A ↘E (113) | D↗ A 5A,5B,5H<br>↘E 5C,5D,5E (123) | 5F, 5G (133) |
| E (104) | ↗A E→D ↘F (114) | A 5A,5H<br>E→D 5F,5G<br>↘F 5B,5C,5D (124) | 5E (134) |

FIG.7(b)

| Present position of cursor | Shift rule of cursor | | |
|---|---|---|---|
| | Possible next positions to shift from the present position | Relation between switches of cursor key and positions of cursor shifted thereby | Cursor key switches which can not shift cursor at present |
| F (105) | F → A, E, G (115) | F: A (5A,5H), E (5F,5G), G (5B,5C,5D) (125) | 5E (135) |
| G (106) | G → A, F, H (116) | G: A (5A,5H), F (5F,5G), H (5B,5C,5D) (126) | 5E (136) |
| H (107) | H → A, G (117) | H: A (5A,5H), G (5F,5G) (127) | 5B,5C,5D,5E (137) |
| I (108) | I → A (118) | I → A (5F,5G,5H) (128) | 5A,5B,5C,5D,5E (138) |

REMOTE-CONTROL APPARATUS FOR ELECTRONICS APPARATUS

This is a continuation of application Ser. No. 07/975,958, filed on Nov. 13, 1992, which was abandoned upon the filing hereof which was a continuation of 07/499,582 filed Mar. 27, 1990, abandoned.

FIELD OF THE INVENTION AND RELATED ART STATEMENTS

1. Field of the Invention

The present invention relates to a remote-control apparatus for controlling a plurality of electronics apparatus which are used in an audio visual system such as a video tape recorder, a laser disc player, an audio tape recorder, etc.

2. Description of the Related Art

Figure 10:
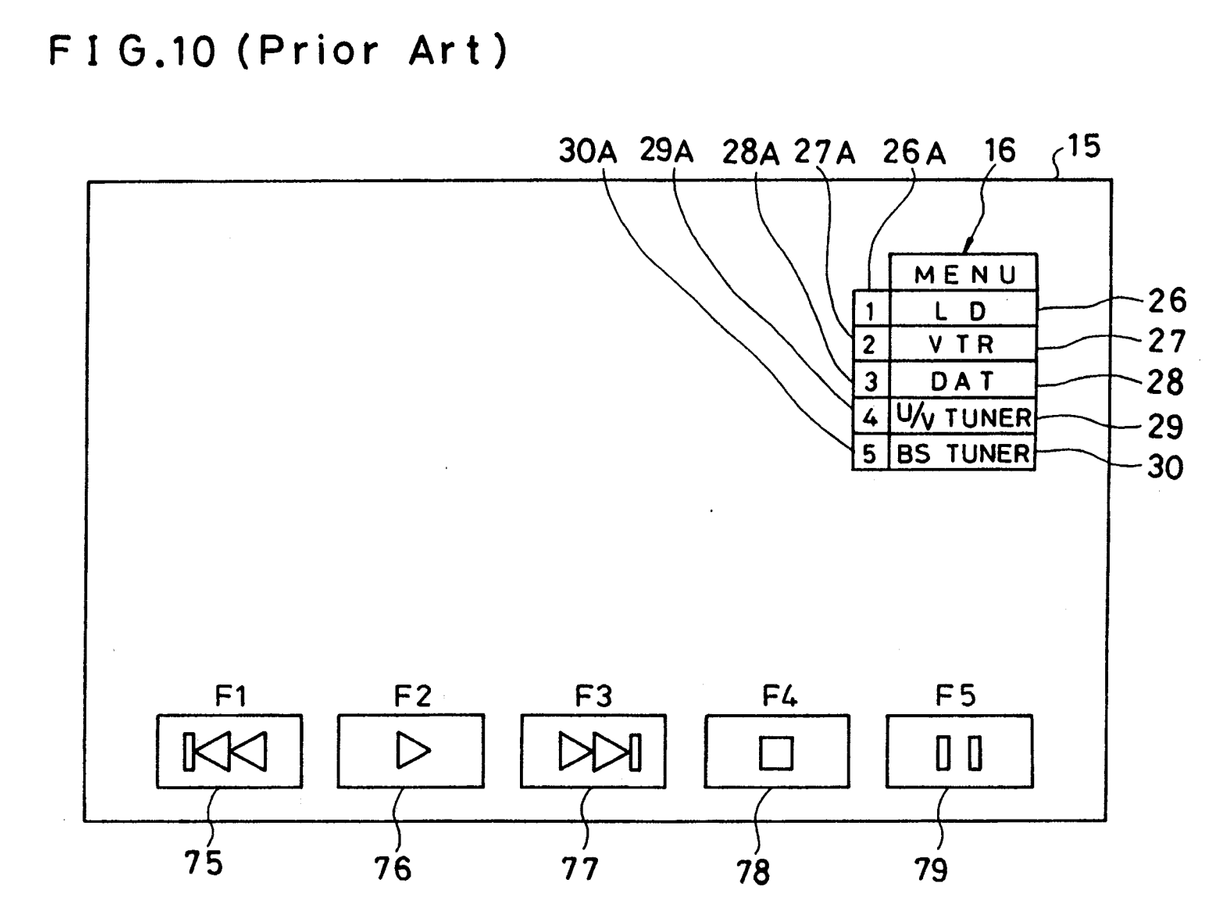
FIG. 10 is the display screen in the remote-control apparatus in the prior art.

The domestic digital bus system (D2B system) is conventionally and widely known as a remote-control system in which a plurality of audio visual apparatus are connected to a common communication line and the respective audio visual apparatus are controlled with one remote-control apparatus. In the above-mentioned system, the respective control functions of the plural audio visual apparatus are registered in the remote-control system in advance. Then, icons showing these control functions are displayed on a display screen 15 of a display apparatus as shown in FIG. 10.

Figure 9:
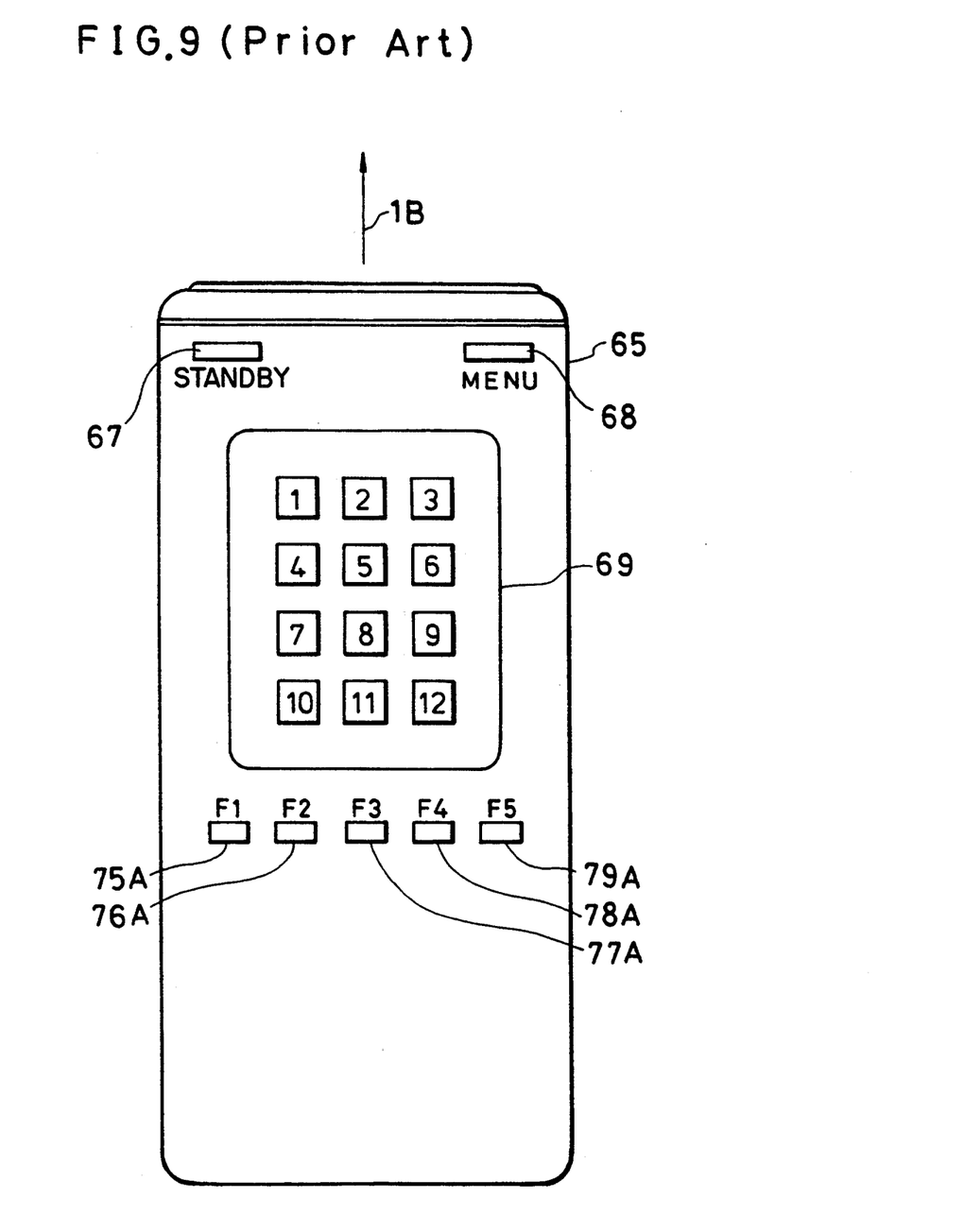
FIG. 9 is the plan view of the remote-control transmitter in the remote-control apparatus in the prior art.

The conventional remote-control system is operated with a transmitter 65 for transmitting a coded wireless signal (of infrared ray, for example). A plan view of the remote-control transmitter 65 is shown in FIG. 9. The remote-control transmitter 65 is provided with function keys 75A, 76A, 77A, 78A and 79A, and function number labels F1, F2, F3, F4 and F5 for showing functions assigned to the function keys 75A, 76A, 77A, 78A and 79A, respectively. Moreover, the transmitter 65 has twelve keys 69.

In use of the control system, first, an operator observes a display screen and elects a desired audio visual apparatus indicated in boxes 26A, 27A, 28A, 29A and 30A of a menu list 16 displayed on the display screen 15. Subsequently, the operator instructs the elected number by manipulating the twelve keys 69 of the transmitter 65. Then, a plurality of operable functions of the instructed audio visual apparatus (five kinds of operable functions is shown in FIGS. 9 and 10 in the example) are displayed by icons 75, 76, 77, 78 and 79 on the under portion of the display screen 15. These icons 75–79 are attached with function numbers F1, F2, F3, F4 and F5 for representing operable functions of the audio visual apparatus. These function numbers F1–F5 corresponds with the function numbers F1–F5 which are attached on the function keys 75a–79a of the transmitter 65.

Detailed motions of the operator in instruction of a desired operable function by using the transmitter 65 is elucidated hereafter.

First, the operator looks at the icons 75–79 of the display screen 15, and recognizes the icon which shows a desirable function in these function numbers F1–F5. Second, the operator looks at remote-control transmitter 65, and manipulates the function keys 75A, 76A . . . or 79A of the transmitter 65 having the same function number elected in the display screen 15. Consequently, the function corresponding to the manipulated function key is indicated in the display screen, and the audio visual apparatus which receives the instruction from the remote-control apparatus is operated according to the function.

In the above-mentioned operation in the remote-control apparatus of the prior art, the operator is forced to look at the display screen 15 and the transmitter 65 alternately, hence the operation involves complications in manipulating the remote-control apparatus. Additionally, the motions for manipulating it can not be rapidly performed.

In particular, when a large number of the audio visual apparatus are connected to the remote-control apparatus, and/or when the respective audio visual apparatus are provided with a variety of operable functions, a large number of icons are displayed on the display screen 15. In a reason similar to that described above, a large number of the function keys must be installed on the transmitter 65, and thus complication of the operation increases. Moreover, the size of the transmitter 65 is enlarged, and hence the remote-control apparatus become costly and deteriorates in performance of operation.

OBJECT AND SUMMARY OF THE INVENTION

An object of the present invention is to provide a remote-control apparatus which is simple in construction, inexpensive to manufacture and superior in performance of operation.

The remote-control apparatus in accordance with the present invention comprises:
  a transmitter comprising:
    a cursor key having at least two switches,
    enter key and menu key each composed of switch means,
    wireless signal generating means for transmitting a wireless signal which is converted into a predetermined code corresponding to operation of the cursor key, enter key or menu key; and
  a receiver comprising:
    a receiving part for receiving the wireless signal transmitted from the transmitter and decoding the received signal,
    connecting means for connecting at least one electronics apparatus to the receiver based on decoded received signal,
    a video signal memory for memorizing video image data for displaying icons of functional information for operation of the electronics apparatus,
    display means for displaying a video image output from the electronics apparatus and video image output from the video signal memory,
    a display control apparatus for controlling output of a video signal from the video signal memory, and for displaying an image of a cursor shifting in compliance with a predetermined rule on the display screen of the display means on the basis of a signal transmitted by the operation of the cursor key.

According to the present invention, the cursor on the display screen can be shifted by operating either one of a group of plural switches of the cursor key of the transmitter.

Namely, plural switches correspond to a shift direction of the cursor. Therefore, in operation of the switches of the cursor key, the operator can grope for the switch which can shift the cursor 20 in a desirable position without looking at the cursor key. Hence, the cursor can be shifted to the desired position by easy and speedy operation of the plural switches. Since the operator can operate the switches to shift the cursor by grouping them watching only the display screen, thus the remote-control can be made quickly and easily.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

CONFIGURATION OF THE EMBODIMENT

Transmitter

Figure 1:
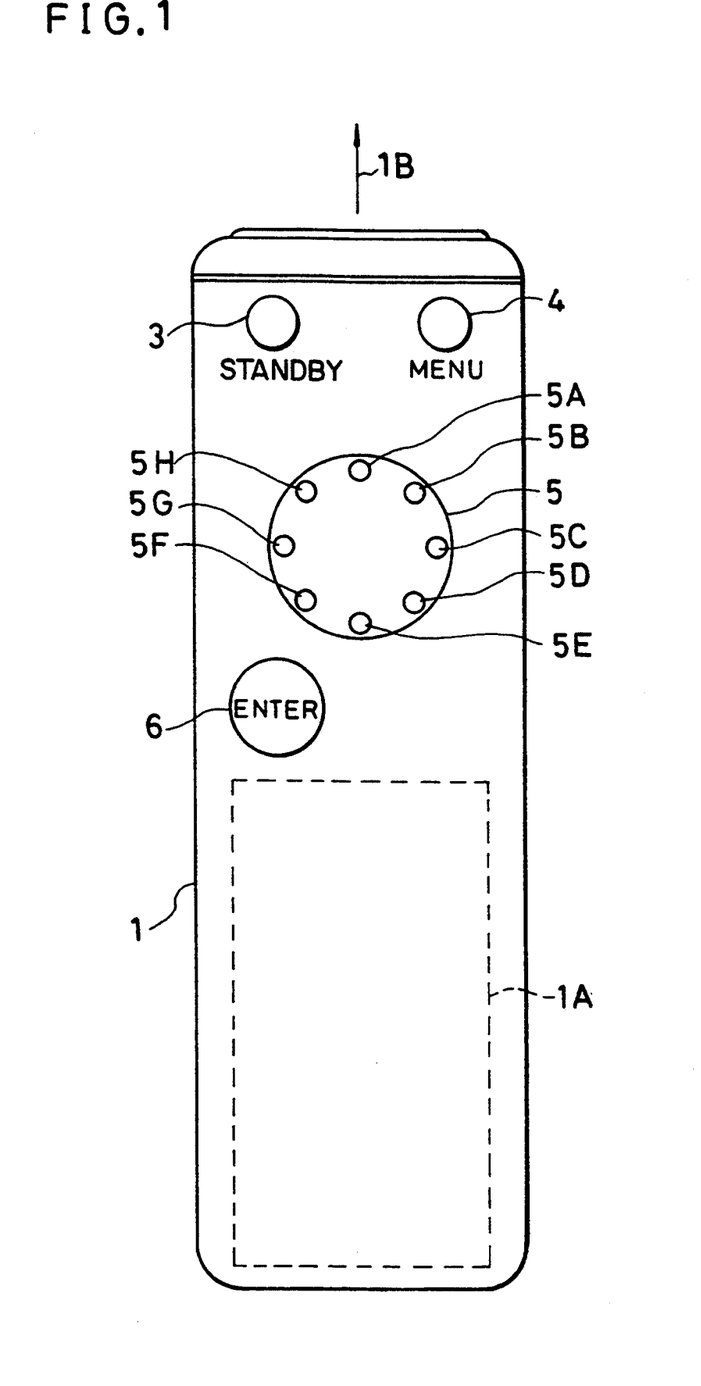
FIG. 1 is a plan view of a transmitter in the remote-control apparatus of an embodiment in accordance with the present invention.

FIG. 1 is a plan view of a transmitter 1 of a remote-control apparatus in an embodiment in accordance with the present invention. Referring to FIG. 1, a wireless signal generator 1A is composed of a circuit for generating a wireless signal (infrared ray signal, for example) which is converted into a predetermined code, and the electric power for the circuit is supplied from a battery contained in the same body, A stand-by key 3 functions as a power switch for activating the remote-control apparatus.

A cursor key 5 is composed of eight switches 5A, 5B, 5C, 5D, 5E, 5F, 5G and 5H which are disposed with the same intervals on a circle. Use of push button switches is recommendable for these switches. The transmitter 1 is further provided with a menu key 4 and an enter key 6 which will be elucidated hereinafter. A wireless signal which is converted into a code is transmitted to a direction shown by an arrow 1B by manipulation of the stand-by key 3, menu key 4, cursor key 5 or enter key 6.

Receiver

Figure 2:
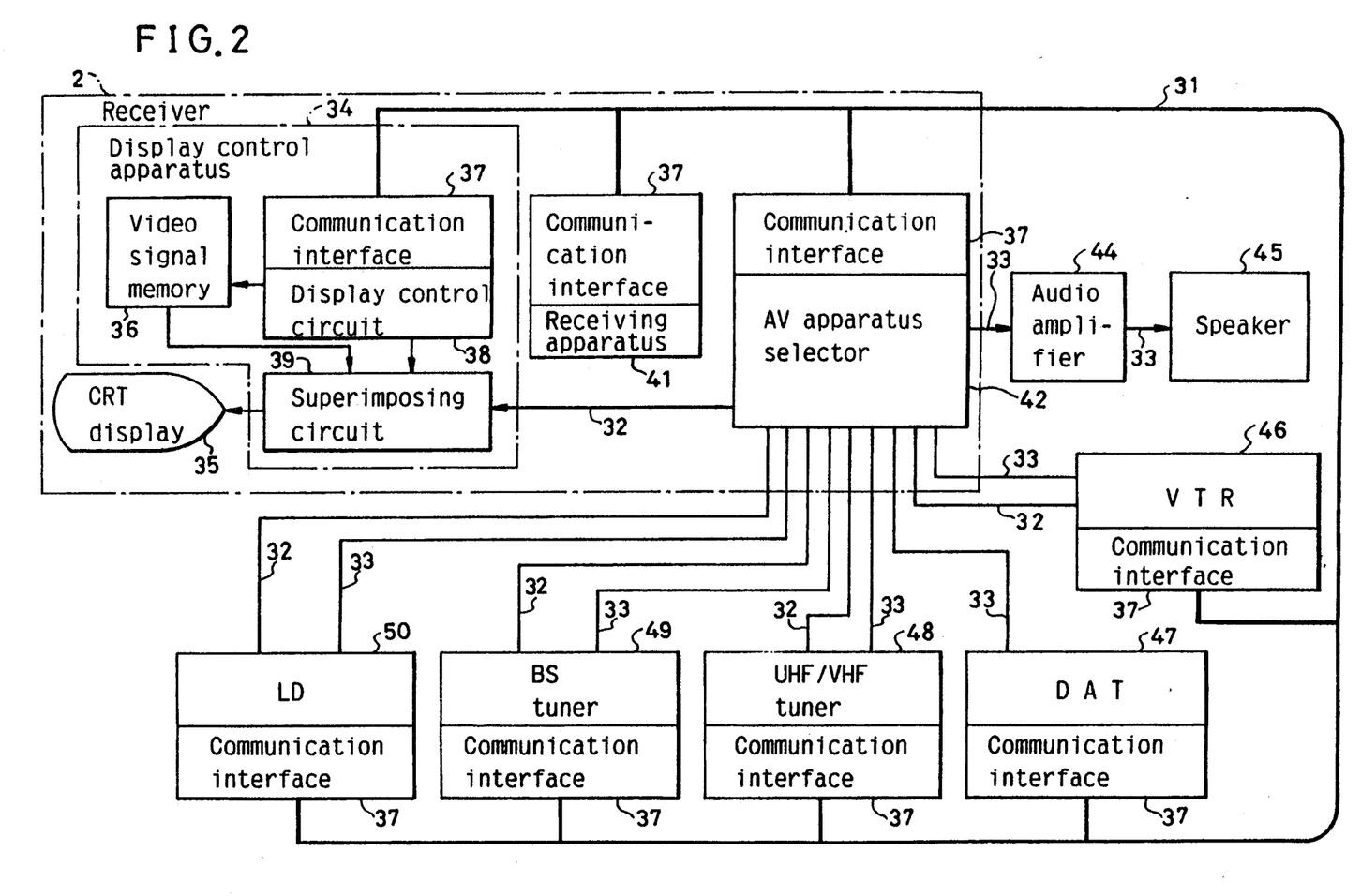
FIG. 2 is a block diagram of a receiver of the remote-control apparatus in the embodiment.

FIG. 2 is a block diagram of a receiver of the remote-control apparatus. Referring to FIG. 2, a VTR (video tape recorder) 46, a DAT (digital audio tape recorder) 47, a UHF/VHF tuner 48, a BS tuner 49 and an LD (laser disc player) 50 are electronics apparatus which are connected to the remote-control apparatus. These electronics apparatus are connected to a common communication bus-line 31 through the respective communication interfaces which are constructed on the basis of respective protocols. The video outputs of the respective electronics apparatus 46–50 are applied to an AV selector (audio-video signal selector) 42, and one of the video output of these electronics apparatus 46–50 is elected by the AV selector 42. Additionally, audio outputs of the respective electronics apparatus 46–50 are also inputted to the AV selector 42, and one of these audio outputs is elected. The elected audio output is applied to a speaker 45 through an audio amplifier 44. The elected video output is inputted to a superimposing circuit 39 in a display control apparatus 34 of a receiver 2. The AV selector 42 is coupled to the communication bus-line 31 through a communication interface 37.

A receiving apparatus 41 for receiving the wireless signal from the transmitter 1 is coupled to the communication bus-line 31 through a communication interface 37 in a similar manner. The receiving apparatus 41 decodes the received signal and outputs to the communication bus-line 31.

The display control apparatus 34 is composed of a display control circuit 38, a video signal memory 36 which memorize video data for displaying various icons and the superimposing circuit 39. The display control circuit 38 is coupled to the communication bus-line 31 through a communication interface 37. The display control circuit 38 controls a desired one of the AV selector 42 on the basis of the output signal from the receiving apparatus 41, and thereby a desired one of the electronics apparatus 46–50 is elected. The superimposing circuit 39 superimposes a video signal inputted from the video signal memory 36 on the video signal inputted from the AV selector 42 through a line 32A, and the superimposed video signal is applied to a CRT display apparatus 35. The CRT display apparatus 35 normally displays the video image output from one of the electronics apparatus 46–50, but when requested by a demand of the operator, a video image of icons output from the video signal memory 36 is superimposed on the video image based on an output from one of the electronics apparatus 46–50.

OPERATION OF THE REMOTE-CONTROL APPARATUS

General Operation

A wireless signal for activating power supply the remote-control apparatus is transmitted by manipulating the stand-by key 3 or the transmitter 1 shown in FIG. 1. The wireless signal is received by the receiving apparatus 41 and is decoded. The decoded signal is inputted into the display control circuit 38, then the power supply of the remote-control apparatus is activated.

Subsequently, a menu list 16 and apparatus windows 17, 18 and 19 for operating the respective electronics apparatus 46–50 are displayed on the display screen 15 by manipulating the menu key 4 of the transmitter 1. The menu list 16 is the list of the electronics apparatus 46–50 which are coupled to the remote-control apparatus. These menu list 16 and the apparatus windows 17–19 are prepared with respect to the electronics apparatus 46–50, and the data are memorized in the video signal memory 36 of the display control apparatus 34. The names of the electronics apparatus 46–50 are displayed on the title bars 21 of the respective apparatus windows 17, 18, 19A, 19B, 19C.

A return box 22 in the icon is for use to erase the apparatus windows 17–19C and to display only the menu list 16. On the apparatus window 17 of the LD 50, for example, the diagram 23 of the LD 50, a status display 25 showing operating status of the LD 50 and an operation switch list 24 for operating the LD 50 are displayed.

Figure 4:
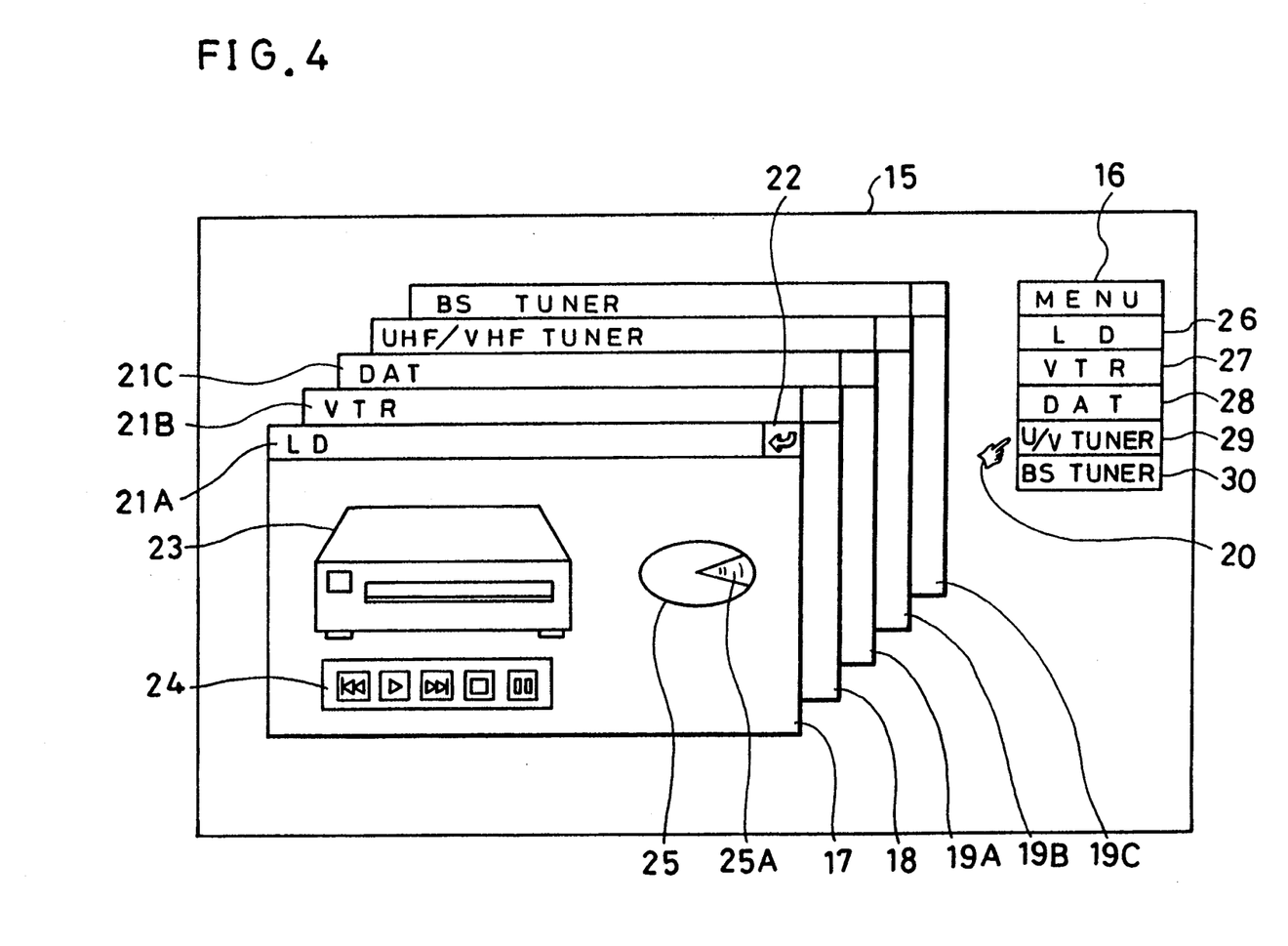
FIG. 4 is a display screen in the embodiment.

In the menu list 16 shown in FIG. 4, the LD 50, VTR 46, DAT 47, UHF/VHF tuner 48 and BS tuner 49 are displayed in boxes 26, 27, 28, 29 and 30, respectively. A finger-shaped cursor 20 is displayed on the display screen 15 and can be shifted to predetermined positions. When the power source is switched on to the remote-control apparatus, the video image from a predetermined electronics apparatus is displayed on the display screen 15 as a "default" video image. The above-mentioned menu list 16, apparatus windows 17–19 and the cursor 20 are superimposed on the default video image. The default video image is made to be automatically displayed when the remote-control apparatus is activated by operation of the stand-by key 3 of the transmitter 1.

Referring to FIG. 4, the cursor 20 is placed at the position indicating the box 29 of the menu list 16, and the UHF/VHF tuner 48 is designated as a signal source of the default video image. In the above-mentioned status, when the menu key 4 of the transmitter 1 is manipulated, the menu list 16 is erased, and only the default video image is displayed.

Operation for electing an electronic apparatus on the menu list 16 is elucidated hereafter. The menu list 16 is displayed on the display screen 15 as shown enlarged in FIG. 5.

Operation of Cursor

Figure 5:
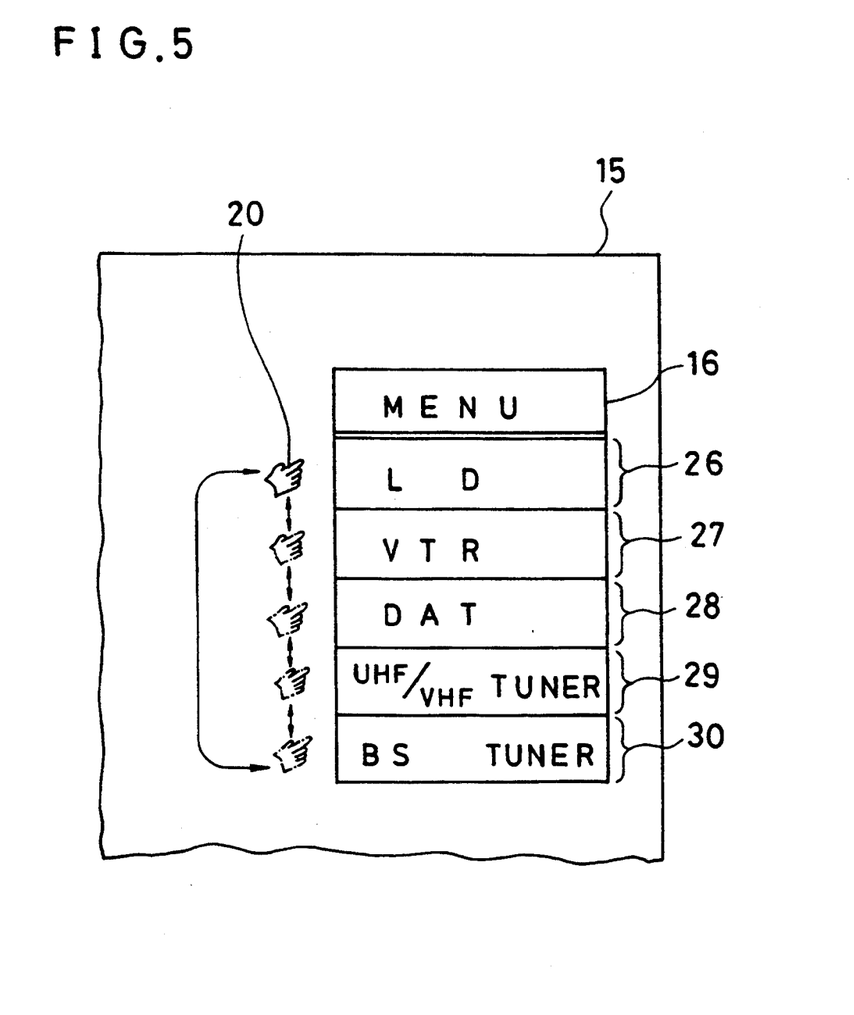
FIG. 5 is the display screen displaying a menu list.

Referring to FIG. 5, first, the cursor 20 is shifted to the box of a desired electronics apparatus by operation of the cursor key 5 of the transmitter 1. In the above-mentioned operation, there is a predetermined rule between the switches 5A–5H to be operated and shifting position of the cursor 20. For example, in order to shift the cursor 20 to an upper position, one of the switches 5H, 5A and 5B, which are on the upper half area of the cursor key 5, is manipulated (pushed) once. Consequently, the cursor 20 moves to upper direction by a distance which is equal to each interval between the neighboring two boxes in the menu list 16, and hence is shifted to the upper box than the box which has been hitherto indicated by the cursor 20.

In a manner similar to that described above, the cursor 20 is further shifted to the next upper box, step by step, by manipulating one of the upper half three switches 5H, 5A and 5B. On the other hand, when one of three switches 5F, 5E and 5D in the lower half area is manipulated, the cursor 20 is shifted to lower position.

Figure 6:
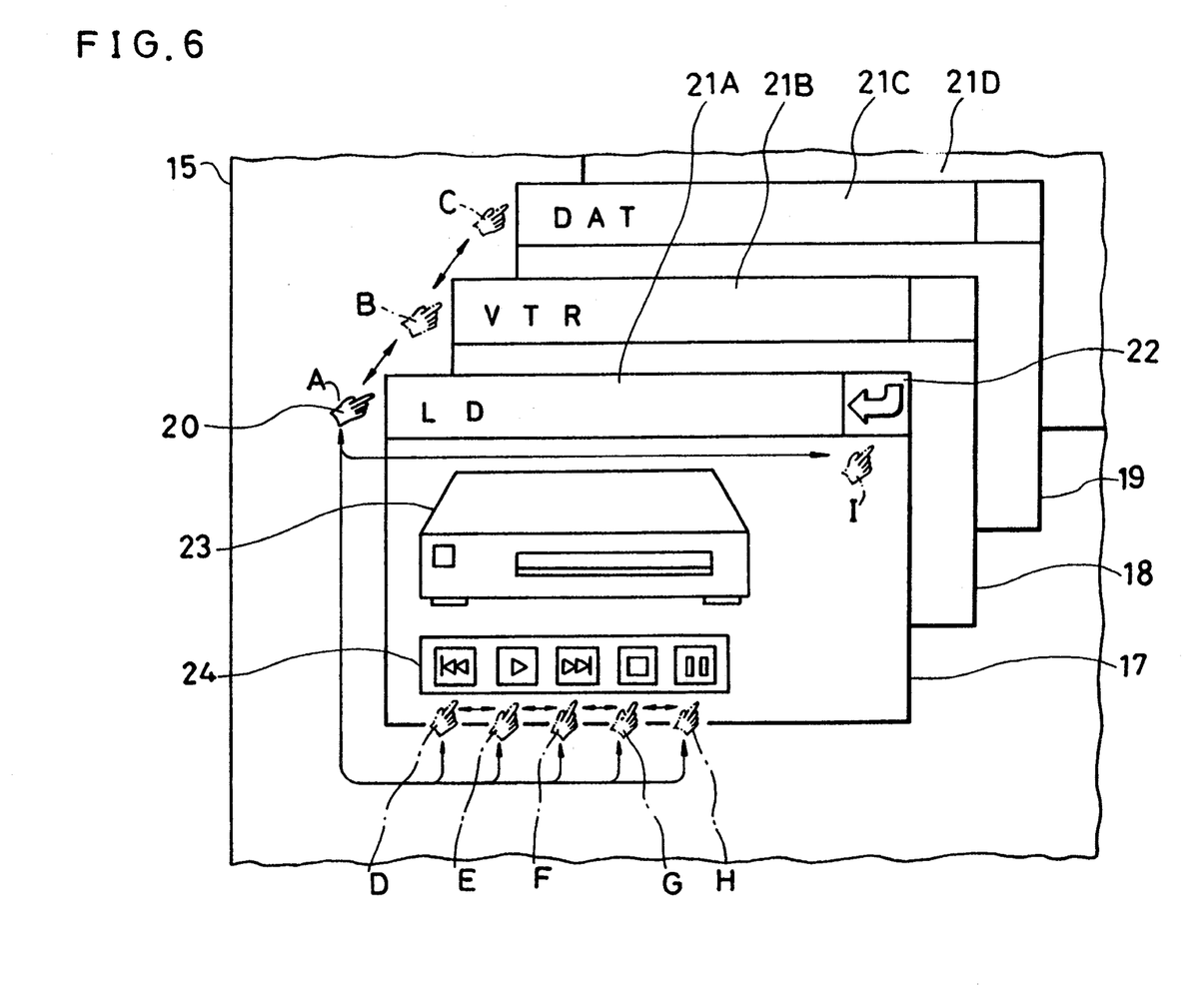
FIG. 6 is the display screen displaying apparatus windows in the embodiment.

After shifting of the cursor 20 to the box of the desired electronics apparatus, the enter key 6 of the transmitter 1 is manipulated. Then, as shown in FIG. 6, the apparatus window 17 of the electronics apparatus designated with the cursor 20 in the menu list 16 (LD 50 in FIG. 5) is displayed in the left portion of the display screen 15. The cursor 20 which has indicated the box 26 of the menu list 16 is shifted to the position indicating the title bar 21A of the apparatus window 17. Additionally, as to other electronics apparatuses, namely, the VTR 46, DAT 47, UHF/VHF tuner 48 and BS tuner 49, only the title bars 21B, 21C, 21D and 21E of the respective apparatus windows 18, 19A, 19B and 19C are displayed.

The positions of the cursor 20 which are shiftable, as mentioned above, are prescribed on the display screen 15 in advance with respect to each apparatus window. For instance, in the display screen 15 shown in FIG. 6, the shiftable positions of the cursor 20 are positions A, B, C, D, E, F, G, H and I, and the cursor 20 is shiftable only to one of these positions.

Subsequently, operation for changing the cursor 20 to one of these positions A–I is described. In the embodiment, there is a predetermined rule between the switches 5A–5H to be operated and a shiftable position of the cursor 20.

Figure 7A:
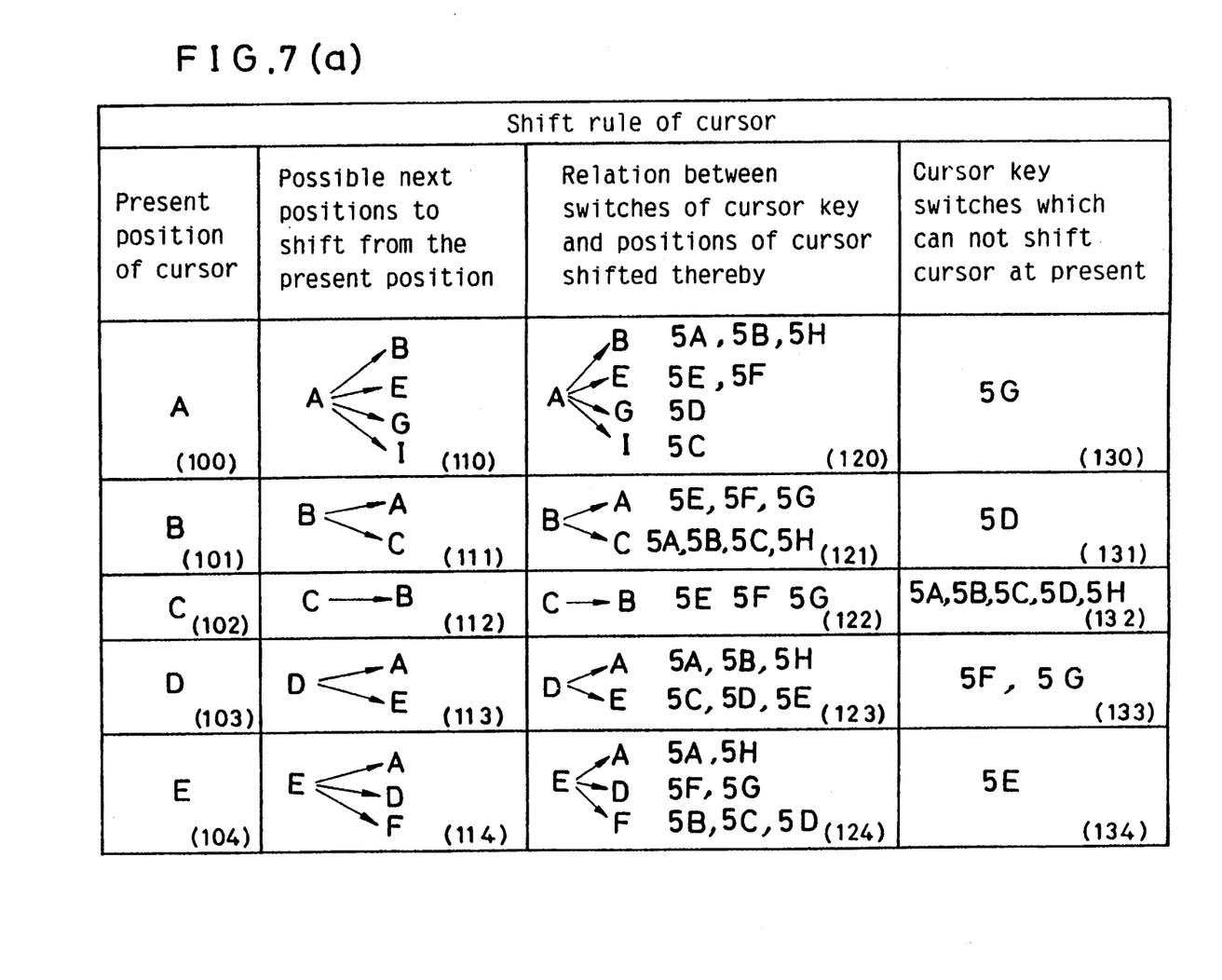
FIGS. 7(a) and 7(b) are reference tables showing shift rule of a cursor.
Figure 7B:
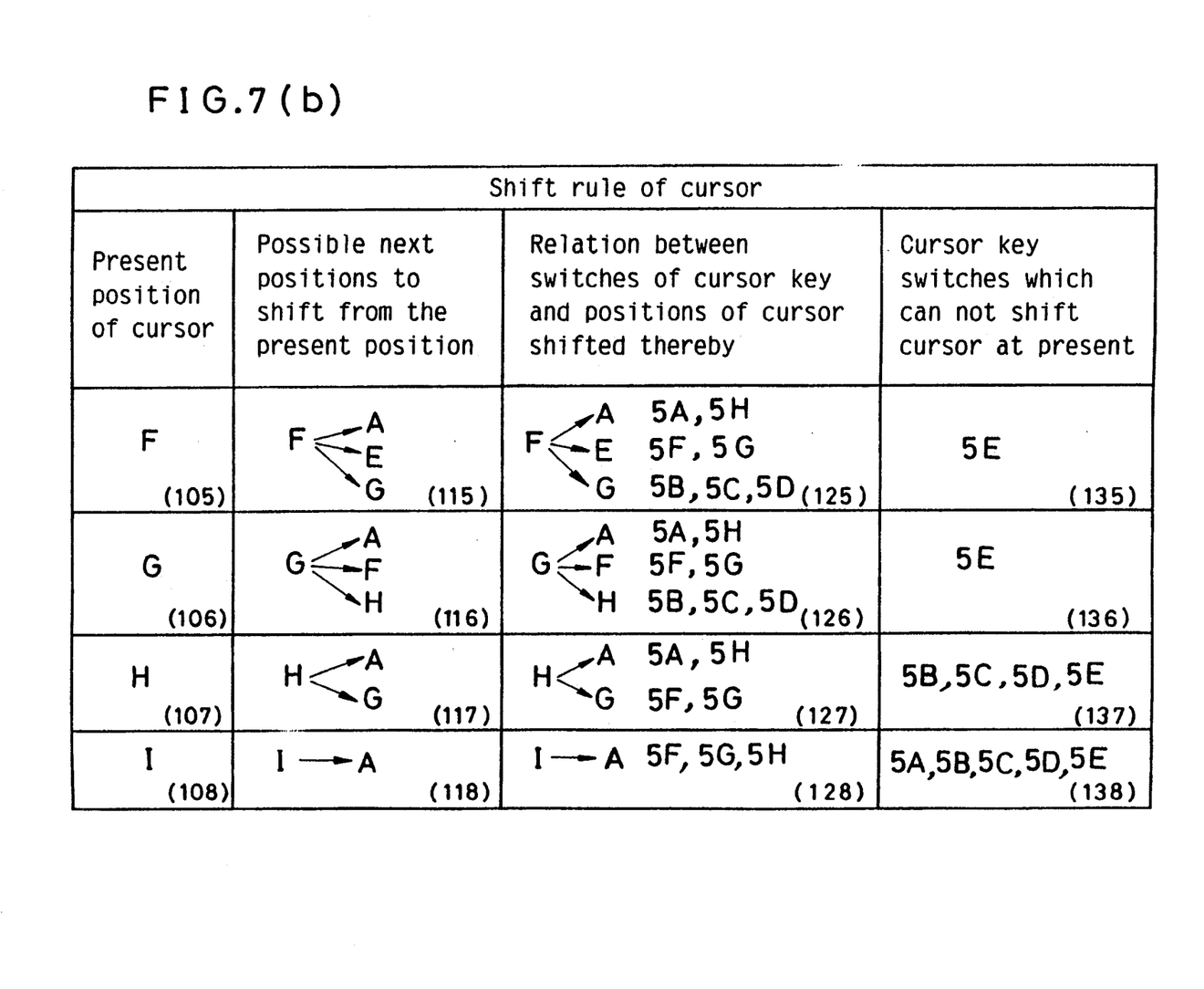

FIGS. 7(a) and 7(b) shows the shift rule of the cursor 20. Referring to FIG. 7(a) and 7(b), "present position of cursor" is the position of the cursor 20 which is presently displayed on the display screen 15 shown in FIG. 6. On the display screen 15, the cursor 20 can be displayed on only the positions A, B, C, D, E, F, G, H and I, and is not displayed on other part of the display screen 15. Referring to the reference table, the present positions of the cursor 20 are shown in boxes 100–108. Possible next positions to shift the cursor 20 from the present position with respect to the present position of the cursor are shown in boxes 110–118. The cursor 20 is shiftable only to the positions shown in the boxes 110–118. For example, when the cursor 20 is at the position A, possible next positions of the cursor 20 are positions B, E, G or I. For other example, when the cursor 20 is at the position I, only the position A is the possible next position of the cursor 20.

In boxes 120–128 or FIG.7(a) and FIG.7(b), relations between switches 5A–5H of the cursor key 5 and positions of the cursor 20, which are shifted by manipulation of the switches 5A–5H, are shown. For example, when the cursor 20 is presently at the position A, the cursor 20 is shifted to the position B when one of switches 5H, 5A and 5B is operated. For other example, in order to shift the cursor 20 to the position E, either switch 5E or 5F must be manipulated. For further example, in order to shift the cursor 20 to the position G, the switch 5D must be operated.

Boxes 130–138 of FIG. 7(a) and FIG. 7(b) show reference numerals of the switch or switches among 5A–5H of the cursor key 5, whose manipulations do not shift the cursor 20 (FIGS. 4, 5, 6), when the cursor 20 is on the position shown in the boxes 100–108, respectively. For example, when the cursor 20 is at the position A of FIG. 6, even if the switch 5G of the cursor key 5 is operated, the cursor 20 is not shifted. For further example, when the cursor 20 is at the position C as shown in the box 102, even if any of switches 5A, 5B, 5C, 5D and 5H is manipulated, the cursor 20 is not shifted.

Referring to FIG. 6, for example, when the cursor 20 is at the position A on the display screen 15, the cursor 20 is shiftable only to the positions B, E, G and (see boxes 100 and 110 in FIG. 7(a)). Then, in order to shift the cursor 20 from the position A to the position B, the shift is effectuated by operating one of the switches 5A, 5B and 5H (see box 120). Further, in order to shift the cursor 20 from the position A to the position I, shift is made by operating the switch 5C of the cursor key 5. Still further, in order to shift the cursor 20 from the position A to the position G, the switch 5D must be operated. Still further, in order to shift the cursor 20 from the position A to the position E, shift is effectuated by operating either one of the switches 5E and 5F. The configuration is made that, even if the switch is operated, the cursor 20 does not shift (see box 130).

As described above, in the embodiment, relation between the possible next positions of the cursor 20 with respect to the present position thereof are prescribed in advance on the basis of the cursor shift rule shown in the boxes 110–118 of FIGS. 7(a) and 7(b). Moreover, the relation between the switches for shifting the cursor 20 and the shift position of the cursor 20 is also prescribed as shown in the boxes 120–128. Then, inactive switches in the shift operation of the cursor 20 with respect to the present position of the cursor 20 are also prescribed as shown in boxes 130–138.

The shift rule shown in FIGS. 7(a) and 7(b) relates to time apparatus window 17 of the LD 50, which is displayed in the display screen 15 of FIG. 6. In a similar manner, rules for the respective apparatus windows of the VTR 46, DAT 47, UHF/VHF tuner 48 and BS tuner 49 are prepared in the video signal memory 36.

Selection of the Apparatus Window

Steps of electing the apparatus windows 17, 18 and 19 shown in FIG. 6 is elucidated hereafter. In FIG. 6, the apparatus window 17 for time LD 50 is displayed on the display screen 15. In the above-mentioned status, the displaying of the apparatus window 18 for the VTR 46 is made by placing the cursor 20 at the position A, followed by manipulation of the enter key 6 of the transmitter 1. Consequently, the display of the apparatus window 17 is erased, and the apparatus window 18 is displayed. After the above-mentioned operation, the cursor 20 is displayed at the position indicating the title bar 21B of the apparatus window 18.

As a further operation, First, the cursor 20 is shifted from the position A to the position B, and subsequently, the enter key 6 is manipulated with the cursor 20 placed at the position B. Consequently, the apparatus window 18 is erased, and the apparatus windows 17 and 19 are displayed on the display screen 15. After the above-mentioned operation, the cursor 20 indicates the title bar 21A of the apparatus window 17.

Furthermore, after shifting of the cursor 20 from the position A to the position C, by manipulation of the enter key 6, the apparatus window 19 is erased. In the above-mentioned status, the display of the apparatus windows 17 and 18 are maintained, and the cursor 20 is displayed at the position indicating the title bar 21A of the apparatus window 17.

When the enter key 6 is operated, after the cursor 20 is shifted from the position A to the position I, all the apparatus windows 17, 18 and 19 which have been displayed on the display screen 15 are erased. And at that time, only the menu list 16 is displayed as shown in FIG. 5. After then, the cursor 20 is displayed at the position indicating the electronics apparatus in the menu list 16 corresponding to one of the title bars 21A, 21B and 21C which was pointed before erase of the apparatus windows 17, 18 and 19.

Selection of Function

Subsequently, selection of a function of the electronics apparatus is instructed by using the operation switch list 24 in the apparatus window 17 shown in FIG. 6. The cursor 20 is shifted to one of the positions D, E, F, G and H of the operation switch list 24 in the apparatus window 17. Then, the enter key 6 is operated. The signal for instructing the action corresponding to the icon designated by the cursor 20 in the operation switch list 24 is applied to the electronics apparatus from the display control circuit 38 shown in FIG. 2. For example, when the cursor 20 is placed at the position E of the operation switch list 24 shown in FIG. 6 and the enter key 6 is operated, the signal for making the LD 50 (of FIG. 2) to "play" is sent to the LD 50. During the time period for sending this signal, the cursor 20 is made blink with a predetermined frequency, or the display of the cursor 20 is erased. Upon reception of the signal and starting of operation "play" of the LD 50, a status signal for showing the status of the "play" operation of the LD 50 is sent to the display control circuit 38. Hence, an icon for showing the status of the operation is displayed in the apparatus window 17 by a status display 25, as shown in FIG. 4. There the status display 25 informs the status by rotating a fan-shaped icon 25A in a predetermined direction. In the above-mentioned operation, if the signal showing the operation "play" is not reliably received, the cursor 20 continues to blink, and indicates that the above-mentioned instruction is not be reliably received by the LD 50.

In the above-mentioned operation, provided that the operation for changing a function must be inhibited for a predetermined time period owing to a particular characteristics of the electronic apparatus, the condition (e.g. time period) for inhibiting the change of functions is registered in the display control circuit 38 in advance. Therefore, in the above-mentioned case, even if subsequent instructions for changing the function is given by the cursor 20, such instructions are neglected, and erroneous operation of the electronics apparatus is prevented. For instance, in case that the icon for instructing close or break of power supply is contained in an operation switch list, even if the icon is instructed with the cursor 20 during operation "play", the instruction is not accepted.

Figure 8:
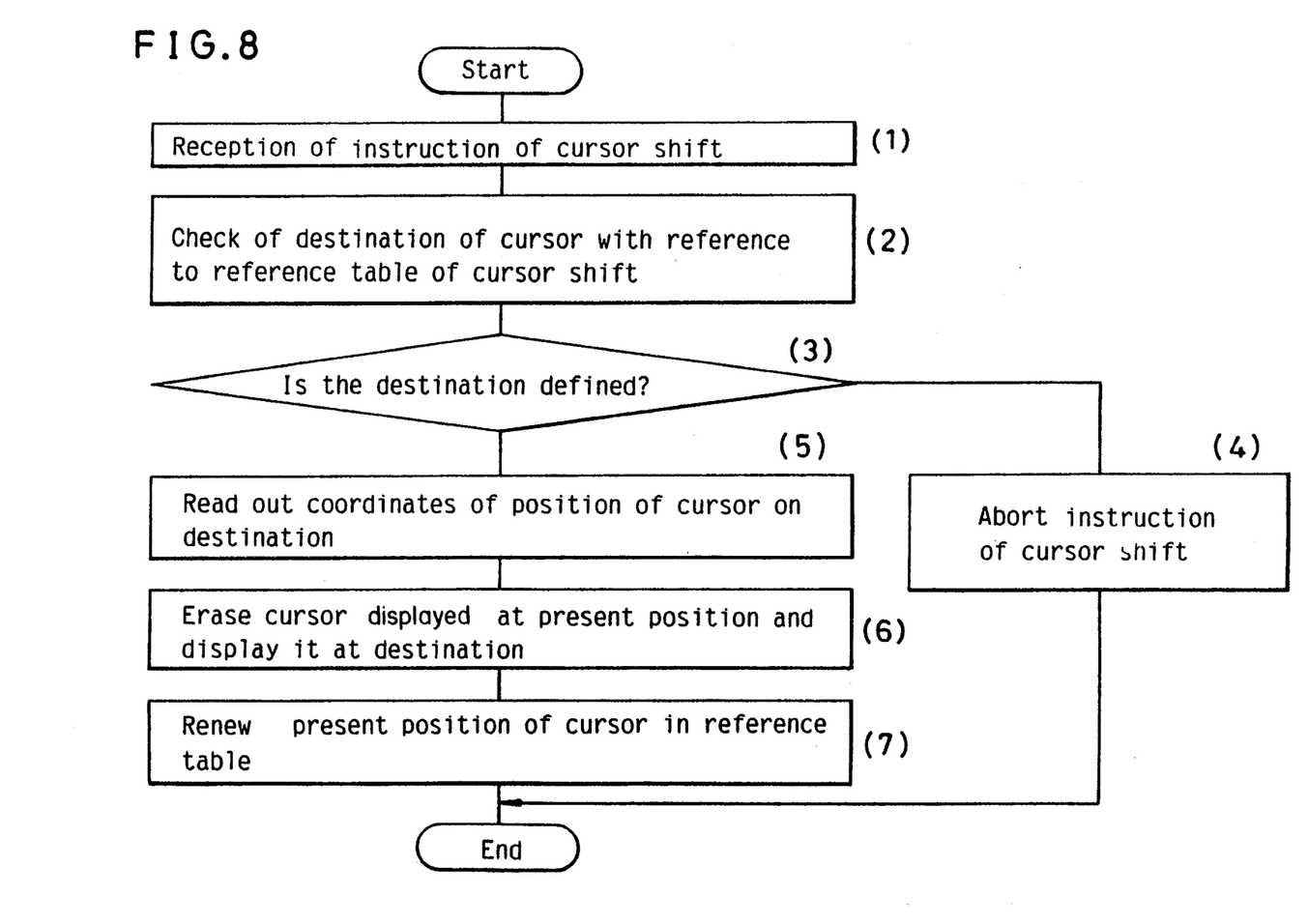
FIG. 8 is a flow chart of a process of shift of the cursor.

FIG. 8 is a flow chart showing operation of shift of the cursor 20.

In step 1, instruction for shifting the position of the cursor 20 is received.

Subsequently, the destination of the cursor 20 is checked in reference with the reference table in the memory with respect to the present position of the cursor 20 (Step 2).

In step 3, it is examined that whether the destination of the cursor 20 is defined in the reference table (Step 3).

If the destination is not defined in the table, the process goes to Step 4, and the shift-instructions of the cursor 20 is aborted as undefined destination (Step 4).

When the destination of the cursor 20 is defined, coordinates of the position of the cursor 20 on the destination is read out (Step 5).

Then, the cursor 20 which is presently displayed is erased and the cursor 20 is displayed at the destination (Step 6).

Finally, the present position of the cursor 20 is renewed in the reference table (Step 7). As mentioned above, shift of the cursor 20 is completed through the above-mentioned seven steps.

Modified Embodiment

Figure 3:
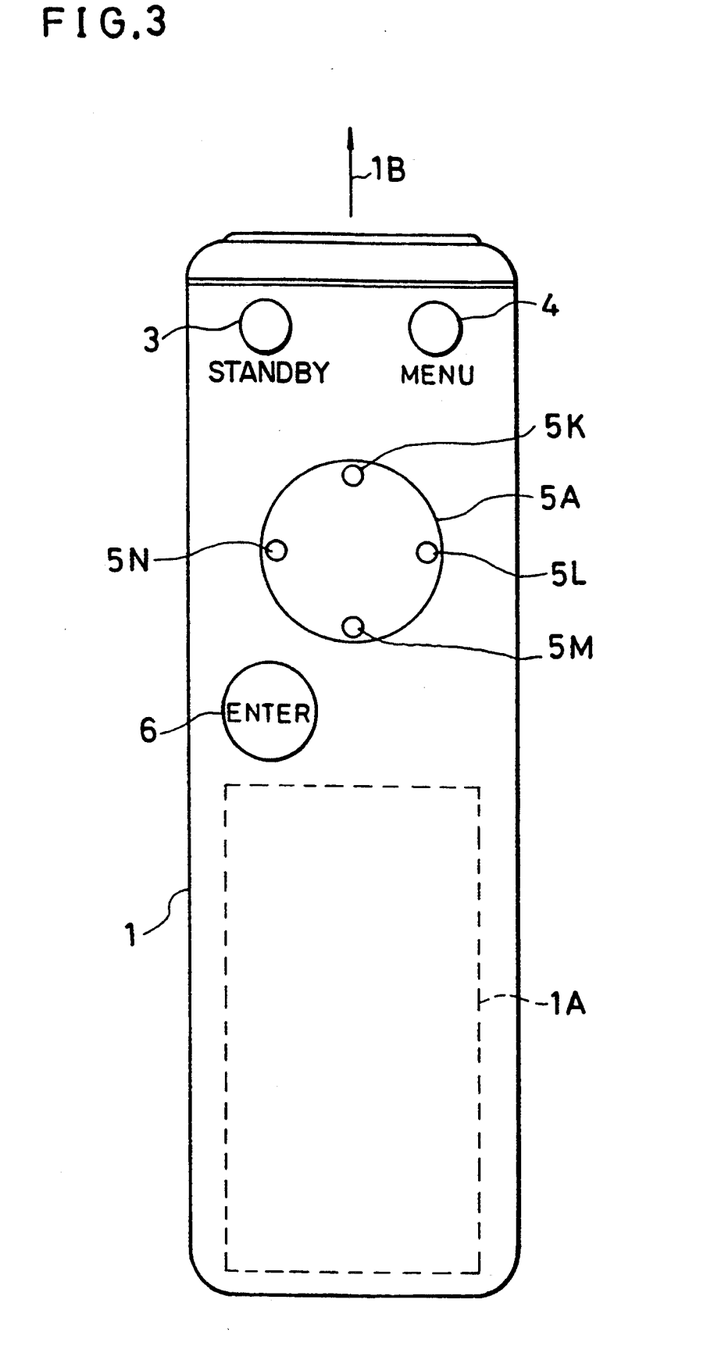
FIG. 3 is a plan view of the transmitter in other embodiment in accordance with the present invention.

Apart from the above-mentioned embodiment, wherein the cursor key 5 of the transmitter 1 is provided with the eight switches 5A–5H, a modified embodiment may be such that the number of switch is not restricted to eight. For example, in other embodiment shown in FIG. 3, cursor key 5A is provided with four switches 5K, 5L, 5M and 5N. In this cursor key 5A, the same function as the switch 5B of the cursor key 5 shown in FIG. 1 is performed by operating the switches 5K and 5L simultaneously. In a similar manner, the same functions as switches 5D, 5F or 5H of the cursor key 5 are performed even by simultaneous manipulation of the switches 5L and 5M, the switches 5M and 5N or the switches 5N and 5K, respectively.

The shift direction of the cursor 20 is not restricted to eight directions. Six directions, ten directions or sixteen directions is applicable to the shift direction of the cursor 20.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A remote-control apparatus comprising:
   a transmitter for transmitting a wireless signal; said transmitter comprising:
      a cursor key having at least one switch;
      an enter key and a menu key; and
      wireless signal generating means for transmitting a wireless signal which corresponds to operation of said cursor key, enter key or menu key;
   a receiver for receiving and processing the wireless signal, said receiver comprising:
      a receiving part for receiving and decoding the wireless signal;
      connecting means for connecting one of at least one electronics apparatus to said receiver based on the decoded wireless signal;
      a video signal memory for memorizing video image data of icons representing functional information for operation of said at least one electronics apparatus;
      display means for displaying a video image output from said one of at least one electronics apparatus and said video signal memory;
      a display control apparatus controlling output of said video signal memory and a display of a cursor on said display means; said display control apparatus also controlling discrete movement of the cursor to a new position, the new cursor position being determined by a predetermined rule embodied in a reference table which determines the new cursor position based on a present cursor position and said wireless signal transmitted by operation of a cursor key switch, the predetermined rule controlling at least one cursor key switch, and wherein a single cursor key switch controlled by said rule corresponds to different cursor movement directions and different cursor positions depending on the present cursor position, such that actuation of said one cursor key switch corresponds to a first movement, when the cursor is in a first position, and corresponds to a second movement, different than said first movement when the cursor is in a second position different than said first position; and
      wherein when said display control apparatus discretely moves the cursor to a new position in compliance with the predetermined rule, said display control apparatus erases the cursor which is presently displayed, and displays the cursor at the new cursor position.

2. A remote-control apparatus in accordance with claim 1, wherein said connecting means comprises:
   communication interfaces provided on said at least one electronics apparatus, said display control apparatus and said receiving part; and
   a common bus-line connecting said communication interfaces for transmitting functional information corresponding to an icon indicated by the cursor.

3. A remote-control apparatus in accordance with claim 1, wherein
   said cursor key comprises eight switches which are arranged on the circumference of a circle at equal intervals.

4. The remote control apparatus of claim 1, wherein the switches of said cursor key are arranged on the circumference of a circle at equal intervals.

5. A remote-control apparatus as in claim 1, wherein the switches of said cursor key are arranged on the peripheral portion of said cursor key at equal intervals for substantially indicating a direction of movement of said cursor.

6. An apparatus as in claim 1 wherein the cursor has a plurality of positions, and a plurality of keys, and in a first position, depression of a first key couples the cursor in a first direction while depression of a second key is not allowed, while when the cursor is in a second position, depression of said first key couples said cursor in a second direction, different than said first direction, and depression of said second key moves said cursor in a different direction than said second direction.

7. A remote-control apparatus comprising:
   a transmitter for transmitting a wireless signal; said transmitter comprising:
      a cursor key having at least two switches;
      an enter key and a menu key; and
      wireless signal generating means for transmitting a wireless signal which corresponds to operation of said cursor key, enter key or menu key;
   a receiver for receiving and processing the wireless signal, said receiver comprising:
      a receiving part for receiving and decoding the wireless signal;
      connecting means for connecting one of at least one electronics apparatus to said receiver based on the decoded wireless signal;
      a video signal memory for memorizing video image data of icons representing functional information for operation of said at least one electronics apparatus;
      display means for displaying a video image output from said one of at least one electronics apparatus and said video signal memory; and
      a display control apparatus controlling output of said video signal memory and a display of a cursor on said display means; said display control apparatus also controlling movement of the cursor to a new position, the new cursor position being determined by a predetermined rule embodied in a reference table which determines the new cursor position based on a present cursor position and said wireless signal transmitted by operation of a cursor key switch, the predetermined rule controlling at least two cursor key switches to correspond to different cursor movement directions and different cursor positions depending on the present cursor position, such that actuation of said one single cursor key switch corresponds to a first movement when the cursor is in a first position, and corresponds to a second movement, different than said first movement, when the cursor is in a second position different than said first position.

8. A remote-control apparatus in accordance with claim 7, wherein said connecting means comprises:
communication interfaces provided on said at least one electronics apparatus, said display control apparatus and said receiving part; and
a common bus-line connecting said communication interfaces for transmitting functional information corresponding to an icon indicated by the cursor.

9. A remote-control apparatus in accordance with claim 7, wherein
said cursor key comprises eight switches which are arranged on the circumference of a circle at equal intervals.

10. A remote-control apparatus in accordance with claim 7, wherein
when said display control apparatus moves the cursor a new position in compliance with the predetermined rule, said display control apparatus erases the cursor which is presently displayed, and displays the cursor at the new cursor position.

11. The remote control apparatus of claim 7, wherein the switches of said cursor key are arranged on the circumference of a circle at equal intervals.

12. A remote-control apparatus as in claim 7, wherein the switches of said cursor key are arranged on the peripheral portion of said cursor key at equal intervals for substantially indicating a direction of movement of said cursor.

13. An apparatus as in claim 7 wherein the cursor has a plurality of positions, and a plurality of keys, and in a first position, depression of a first key couples the cursor in a first direction while depression of a second key is not allowed, while when the cursor is in a second position, depression of said first key couples said cursor in a second direction, different than said first direction, and depression of said second key moves said cursor in a different direction than said second direction.

* * * * *